H. A. STEEN.
COMPOUND BAND BRAKE.
APPLICATION FILED OCT. 27, 1910. RENEWED OCT. 27, 1916.
1,279,778.
Patented Sept. 24, 1918.
2 SHEETS—SHEET 1.
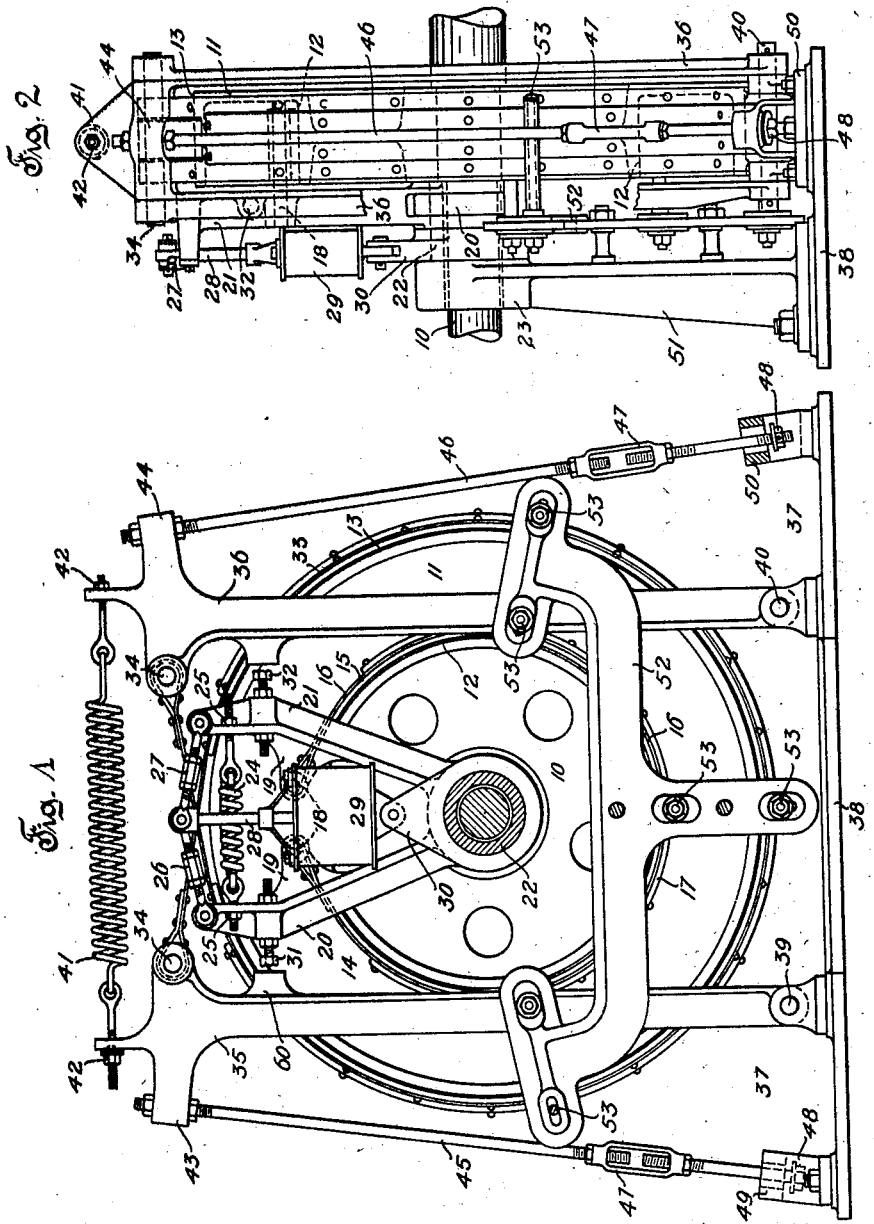

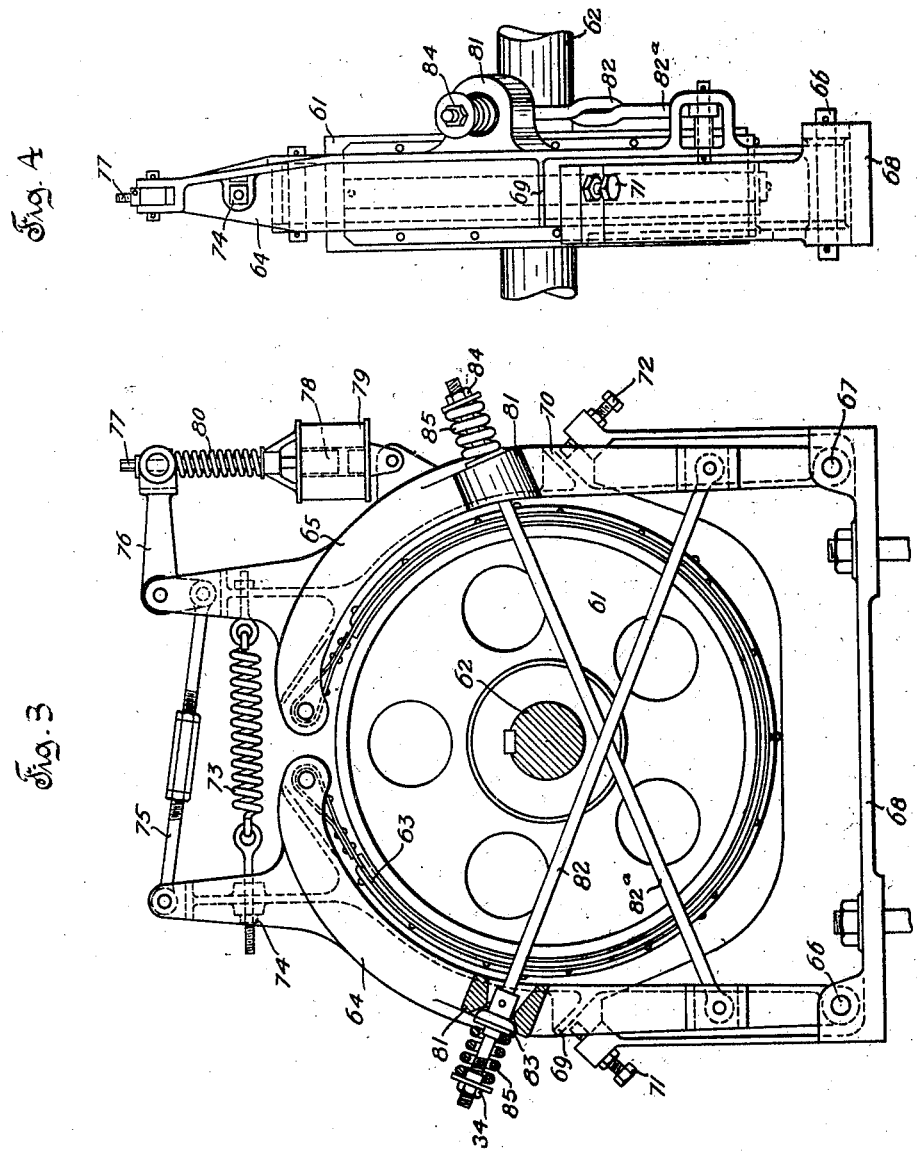

UNITED STATES PATENT OFFICE.

HALFDAN A. STEEN, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

COMPOUND BAND-BRAKE.

1,279,778.  Specification of Letters Patent.  Patented Sept. 24, 1918.

Application filed October 27, 1910, Serial No. 589,435. Renewed October 27, 1916. Serial No. 129,000.

*To all whom it may concern:*

Be it known that I, HALFDAN A. STEEN, a subject of King of Norway, residing at Milwaukee, in the county of Milwaukee and State of Wisconsin, have invented certain new and useful Improvements in Compound Band-Brakes, of which the following is a full, clear, and exact specification.

This invention relates to brakes and particularly to band brakes.

One of the objects of my invention is to provide a compound brake for effectively multiplying the energy of retarding forces.

Another object of my invention is to improve the construction of brakes, making them more simple and durable than those disclosed in the prior art and at the same time having all the advantages of quick and effective action.

When motors are used for driving cranes and for operating hoists, it is advantageous to provide a braking device by which the motor is promptly and automatically brought to rest upon the interruption of electric supply circuit connections, or in case of accident to mechanical parts. This result is usually accomplished by providing a spring or some similar mechanical means for applying the brake and an electro-responsive device for releasing the brake. Band brakes have been employed for these purposes but compound band brakes or brakes capable of effectively multiplying the energy of retarding forces heretofore have not been obtained. The compound band brakes which I have provided are effective for both directions of motor rotation without sacrificing the efficiency of the brakes.

The relatively stationary contact or braking member of my invention preferably comprises a band of asbestos interwoven with metal particles and which is in the form of an interrupted ring, and is adapted to engage practically the entire circumference of the brake wheel or wheels when the brake is applied. The inner diameter of the asbestos band is slightly greater than the outer diameter of the brake wheel or movable member thereby permitting the band to release itself readily from the outer surface of the movable member as soon as the pressure tending to apply the brake is released. A plurality of reinforcing members are wrapped around and secured to the asbestos ring, and the ends of one of these reinforcing members secured to levers through which forces are transmitted for bringing the band or bands into engagement with the wheel. A comparatively light spring is employed for setting or applying the band brake, thus permitting the use of a light electro-magnet for releasing the same.

The various novel features of my invention will be apparent from the description and drawings and will be particularly pointed out in the appended claims.

The invention is illustrated in the accompanying sheets of drawings in which Figure 1 is a side elevation of a brake designed in accordance with my invention;

Fig. 2 is an end elevation of the same;

Fig. 3 is a side elevation of a brake which is a modification of that illustrated in Figs. 1 and 2;

Fig. 4 is an end elevation of that shown in Fig. 3.

Mounted on a shaft 10 to be driven by a motor or any other power transmitting member is a brake wheel 11 having an inner or primary braking surface 12, and an outer or secondary braking surface 13. These braking surfaces are formed on this brake wheel 11 which has concentric annular flanges of different diameters. The inner or primary braking surface is adapted to be engaged by a brake band 14, which comprises an inner strip 15 preferably of asbestos interwoven with metal particles and adapted to engage directly the cylindrical braking surface 12 of the wheel 11. This brake band of asbestos is secured by rivets to a strip of the metal 16 which in turn is secured by rivets to a comparatively heavy reinforcing member 17. The ends of this brake band are secured by the metal bands 16 to pins 18, which are located in projections 19 of arms 20 and 21. These arms 20 and 21 are mounted movable relatively to each other on a flange 22 which forms part of the bearing 23 in which the shaft 10 rotates. The arms 20 and 21 are biased toward each other under the tension of a coil spring or resilient member 24. The effective strength of this spring may be varied by adjusting nuts 25 which hold the spring securely in said arms. Secured to the upper portion of the arms 20 and 21 are turn buckle members 26 and 27 respectively, which engage a rod 28 connected to the movable member of a magnet 29, the latter being pivotally secured to a projection 30 on the flange 22. The turn buckle members 26 and 27, and the rod 28 are so arranged relatively to each other that when the force holding the movable member of the magnet down in its normally operating position is released, the spring 24 acts in such a way as to force the rod with its movable magnet member upwardly drawing the arms 20 and 21 toward each other to set the inner or primary band brake 14 against its braking surface 12. The arms 20 and 21 are further provided with adjustable members 31 and 32 respectively which will be considered presently.

The outer or secondary braking surface 13 is adapted to be engaged by another band brake 33 which is similar to the band brake 14 and the ends of which are connected to pins 34 located in the arms 35 and 36 of a movable transmitting and supporting frame 37. These arms 35 and 36 are pivotally connected to a base 38 at the points 39 and 40 respectively, and are biased toward each other under the tension of a comparatively light spring 41 extending between the upper portions of the arms 35 and 36. This spring is employed to hold the secondary band brake away from its braking surface under normal operating conditions. The effective strength of this spring may also be varied by the use of nuts 42, which retain the spring 41 in a comparatively fixed position. The upper parts of the arms 35 and 36 are provided also with projections 43 and 44 respectively to which are secured, and through which pass, rods 45 and 46 respectively. These rods are provided with turn buckles 47 and nuts 48 which are adapted to limit the movements of the rods by engaging stopping portions of sockets 49 and 50 respectively, which are secured to the base 38.

Supported by a pedestal 51, upon which the bearing 23 is mounted, is a frame 52 which is provided with a plurality of studs 53. These studs can be adjusted in the frame and are adapted to support the band brakes 14 and 33 in a manner such that when the band brakes are released from the braking surfaces, the bands will be separated from the brake wheels an equal amount around their entire peripheries.

When electrical connections are made, the motor being in operation, and the magnet energized, the brake bands 14 and 33 are out of engagement with their respective braking surfaces and the spring 24 is under tension tending to draw the arms 20 and 21 closer together to set the brake. When the electrical connections are broken the magnet becomes deënergized. Due to the action of the spring 24 under these conditions the rod 28 is drawn upwardly and the band brake 14 is forced into engagement with the primary braking surface 12 immediately retarding the motor. Assuming that the shaft is rotating in a counter-clockwise direction, upon the application of the band brake 14, the arm 20 is forced in a direction such that its stud 31 engages a stop 60 on the arm 35 forcing or tilting the arm 35 in the same direction in which the arm 20 was moving thus setting the outer or secondary band brake against its braking surface 13. The arm 35, however, can be forced in that direction only a yieldingly limited amount on account of the nut 48 engaging a stopping portion of the socket 50. When the arm 35 has been forced over into this direction, due to the action of the spring 24 and the coacting arms 20, 21 and 35, 36 the band brakes are applied with their maximum forces against their braking surfaces 12 and 13. Under ordinary conditions the primary brake taken alone will stop a motor in a comparatively few revolutions, but when both the primary and secondary brakes are set consecutively the braking effort is compounded or multiplied many times causing practically the instantaneous stoppage of the motor.

While applicant has considered the braking action only in one direction of rotation, the brake is applicable for use in both directions of motor rotation and is as effective in one direction of rotation as it is in the other. This self-applying reversible compound brake may have its retarding force multiplied to any degree by changing the dimensions of the braking surfaces. Any number of braking wheels and bands can also be used, and applicant does not limit himself to any particular arrangement of the braking members.

In one of the modifications of my invention, which I have illustrated in Figs. 3 and 4, I use a compound brake having only one braking surface and one brake band, but I have provided an arrangement whereby the value of the retarding force originally developed is multiplied many times by an automatic action of the brake structure. The brake wheel 61 having a single braking surface is mounted on a shaft 62 and is adapted to be engaged by a brake band 63 the ends of which are secured to the end portions of arms 64 and 65 respectively, which are pivoted at points 66 and 67 respectively to a base 68. The arms 64 and 65 are provided with brackets 69 and 70 respectively adapted to engage adjustable stops 71 and 72 respectively on the base structure 68. The arms 64 and 65 are biased toward each other by the action of a spring 73, the effective tensional force of which may be varied by adjusting a screw 74. The arm 64 is connected through a rod 75, crank 76, and rod 77 to the movable member 78 of the magnet 79. A spring 80 acts to counterbalance the weight of the movable member 78 of the magnet. The arms 64 and 65 are also provided with lugs 81 through which rods 82 and 82ᵃ pass. The rod which passes through the lug on one arm is pivotally secured to the other arm. Surrounding the rods 82 and 82ᵃ and interposed between the collars 83 and nuts 84 on said rods are coil springs or resilient members 85 which are adapted to multiply the value of the retarding effort or force of this compound brake. The collars 83 are limited from sliding on the rods by stops adjacent thereto fixed to the rods. The effectiveness of the coil springs 85 may be varied by adjusting the nuts 84 along the rods 82 and 82ᵃ.

As in the first instance when the electrical connections are made, the motor being in operation the magnet will be energized, and the brake band 63 will be out of engagement with its brake wheel 61. But when the electrical connections are broken the magnet will be deënergized. Assuming under these conditions that the motor is rotating in a counter-clockwise direction, the spring 73 will draw the arms 64 and 65 closer together forcing the brake band 63 into forceful contact with the brake wheel 61. The arm 64 will immediately be forced or tilted to the left compressing the coil spring 85 on that side, which draws the other arm 65, by means of the rod 82, also to the left forcing the brake band into more forceful and intimate engagement with the brake wheel thus adding to the retarding force. At the point where the bracket 69 engages the stop 71 the springs 73 and adjacent spring 85 will exert their maximum forces multiplying many times the value of the original braking effort. This multiplying of the value of the braking or retarding effort is effective in both directions of rotation. The reversible brake necessitates the use of only one brake wheel and brake band and depends upon the arrangement of the springs and levers for its compounding or multiplying retarding or braking effect.

There may be many modifications in the precise form and arrangement herein shown and described, and I intend in my claims to cover all such modifications which do not involve a departure from the spirit and scope of my invention.

What I claim as new is:

1. The combination with a rotatable member, of a compound brake having a plurality of brake bands, and means for automatically and consecutively applying said brake bands by the application of power to the ends of said bands.

2. The combination with a movable member, of a band brake associated therewith, an additional band brake for said movable member, and means for effecting the application of said brakes the application of said first named brake effecting the subsequent application of the second brake to multiply the retarding effort.

3. The combination with a rotating member, of an inner primary band brake therefor, an outer secondary band brake, means for operating said primary brake, and connections normally inoperative and operative to effect the application of said secondary brake after the setting of the primary brake.

4. The combination with a rotary shaft, of a friction pulley on said shaft, a band brake for bearing on said pulley, arms for supporting said band brake, means for moving said arms toward each other to apply said brake, a support for said arms constructed to permit the same to tilt in the direction of rotation of said pulley, and an additional band brake associated with said pulley, and means actuated by the tilting of said support for effecting the consecutive application of said brakes.

5. The combination with a rotary member, of supporting arms, a band brake constructed to retard the motion of said rotary member when said arms are moved toward each other, a second band brake for acting on said rotary member, means for applying said first band brake for the application of said second band brake, power multiplying means for increasing the effectiveness of said brakes, and electro-magnetic means for releasing said brakes.

6. In combination, a moving member, a brake band associated therewith, arms for supporting said brake band, a second brake band associated with said member, and arms for supporting said second brake band, said first mentioned arms being forced toward each other and said second mentioned arms away from each other for applying said brake bands to retard the motion of said moving body.

7. In combination with a rotatable shaft, a pulley mounted thereon and provided with two concentric flanges of different diameters, a compound band brake for said pulley comprising braking bands adapted to engage said flanges, movable frames to which the ends of the respective braking bands are secured, means for holding said braking bands out of operative engagement with said flanges, means for moving one frame to render the braking band of the flange of smaller diameter effective, said latter means being effective on the failure of said holding means, and a connection between said frames whereby movement of the frame first moved is communicated to the other frame for rendering the braking band on the flange of larger diameter effective.

8. The combination with a rotating member having a plurality of flanges, of an inner primary band brake adapted to engage one of said flanges, an outer secondary band brake adapted to engage another of said flanges, means for applying the primary band brake, and connections between said brakes for effecting the subsequent application of the secondary band brake.

9. In combination, a braking device comprising a rotating element having a plurality of braking surfaces, a brake adapted to frictionally engage one of said braking surfaces, means for actuating said brake to effective braking position, a band brake adapted to frictionally engage the other of said braking surfaces, actuating means for said band brake comprising movable members each connected to an end of said band brake, and means rendered operative on the application of said first brake for applying power to one or the other of said movable members to cause the actuation of said band brake to effective braking position.

10. In combination, a braking device comprising a rotating element having a plurality of braking surfaces, a brake of the band type adapted to frictionally engage one of said braking surfaces, means for actuating said brake to effective braking position, a second band brake adapted to frictionally engage the other of said braking surfaces, actuating means for said second band brake comprising pivoted members each connected to an end of said second band brake, and means rendered operative on the application of said first band brake for applying power to one or the other of said pivoted members to cause the actuation of said second band brake to effective braking position.

11. In combination, a braking device comprising a rotating element having a plurality of braking surfaces, a brake of the band type adapted to frictionally engage one of said braking surfaces, actuating means for causing the operation of said brake to effective braking position, said actuating means comprising devices for simultaneously applying power to both ends of said band brake, a second band brake adapted to frictionally engage the other of said braking surfaces, actuating means for said second band brake comprising movable members each connected to an end of said second band brake, and means rendered operative on the application of said first brake for applying power to one or the other of said movable members to cause the actuation of said second brake to effective braking position.

12. In combination, a braking device comprising a rotating element having a plurality of braking surfaces, band brakes each adapted to frictionally grip one of said braking surfaces through an angle greater than 180 degrees, means for actuating one of said band brakes to effective braking position, and means comprising pivotally mounted members connected to the ends of the second band brake for actuating the latter brake to effective braking position, said latter means comprising pivotally mounted members connected to the ends of said second brake, either of said pivotally mounted members being actuatable to cause the application of said second brake.

13. In a brake, the combination of a rotatable element, a band brake associated therewith, a pivoted arm, said band brake being attached at one end to said pivoted arm, and means for actuating said band brake to applied position, said means being operatively connected to said arm on the same side of the pivotal point thereof as the point of attachment of said band brake thereto, and means for effecting the application of said band brake, said latter means comprising a second brake effective to exert an initial retarding effect on said rotatable element.

14. In combination, a rotatable element, a band brake associated with said rotatable element, means for effecting the application of said band brake to exert a retarding effect on said rotatable element, and means associated with and rendered operative through said brake-applying means subsequent to the exertion of an initial retarding effect on said rotatable element by said band brake for causing the total retarding effect exerted on said element to be increased beyond that capable of being exerted through said brake-applying means alone, said means for causing an increase in the retarding effect comprising an auxiliary braking element associated with said rotatable element.

15. In combination, a rotatable member, a band brake associated with said rotatable member, means for tightening said band brake to exert a retarding effect on said member, and means separate and independent of and rendered operative through said brake-tightening means subsequent to the exertion of an initial retarding effect on said rotatable member by said band brake for causing the total retarding effect exerted on said member to be increased beyond that capable of being exerted through said brake-tightening means alone.

16. In a brake, the combination of a shaft, a brake wheel, a support, an arm pivoted to said support, a brake band attached at one end to said pivoted arm, and means for actuating said brake band to applied position, said means being operatively connected to said arm on the same side of the pivotal point thereof as the point of attachment of said brake band thereto, and means for multiplying the retarding effect exerted on said shaft, said latter means comprising an actuating element operatively associated with said pivoted arm for actuation thereby on such actuation of said arms as results in the application of said brake band and subsequent to the exertion of an initial retarding effect by said brake band.

17. In combination, a rotatable element, a band brake associated therewith, means for applying said band brake to exert a retarding effect on said rotatable element, a second band brake, and means rendered operative through and subsequent to the initial application of said first band brake for effecting the application of said second band brake.

18. In combination, a rotatable element, a plurality of brakes associated with said element, and operative to exert retarding effects thereon, one of said brakes being of the band type, means for applying the other of said brakes, and means rendered operative through the application of said latter brake for effecting the application of said band brake.

19. In combination, a rotatable element, a plurality of brakes associated therewith and operative to exert retarding effects thereon, one of said brakes being of the band type, means for applying one of said brakes, and means rendered operative through the application of said latter brake for effecting the application of the second brake.

20. In combination, a rotatable element, a brake associated therewith, means for applying said brake to exert a retarding effect on said rotatable element, said brake being movable in the direction of rotation of said element on the initial application of said brake, a band brake, and means rendered operative by the rotary movement of said brake and subsequent to the initial application thereof for effecting the application of said band brake to exert a further retarding effect on said rotatable element.

21. In combination, a rotatable element, a band brake, means for applying said band brake to exert a retarding effect on said rotatable element, said band brake being movable in the direction of rotation of said element on the initial application of said brake, a second band brake, and means rendered operative by the rotary movement of said first band brake for effecting the application of said second band brake.

22. In combination, a rotatable member, a band brake for said member, a pivotally mounted arm rotatable about the axis of said rotatable member, means associated with said arm and normally capable of effecting the application of said brake, and normally inactive means effective to overcome said first mentioned means and render said brake inoperative.

In testimony whereof I affix my signature, in the presence of two witnesses.

HALFDAN A. STEEN.

Witnesses:
 CHAS. L. BYRON,
 ROB E. STOLL.